T. COOK.
ICE MACHINE.
No. 171,267.          Patented Dec. 21, 1875.
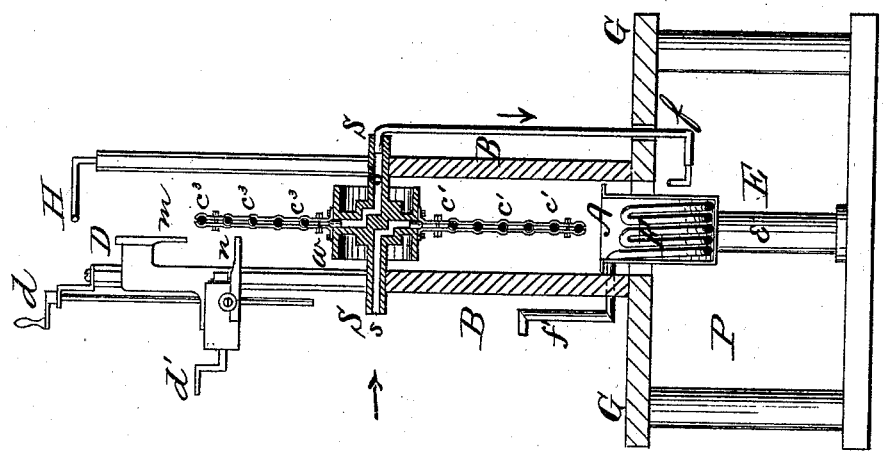
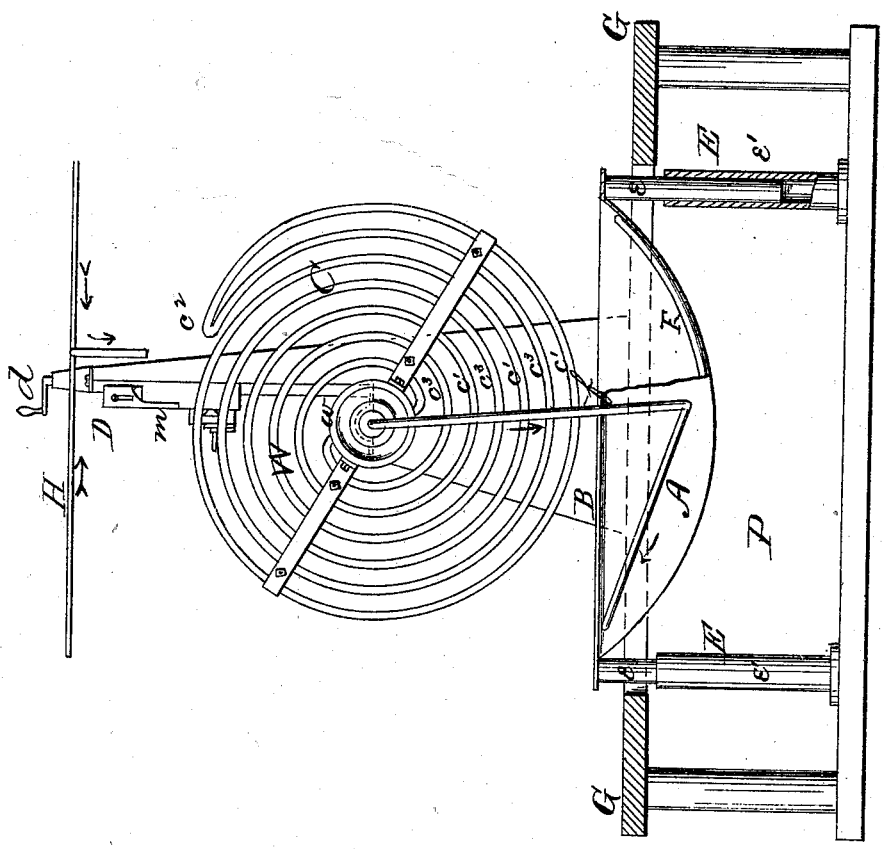
WITNESSES
Granville Lewis
M. Church
INVENTOR
Thomas Cook
By Hill & Ellsworth
His Attorneys

UNITED STATES PATENT OFFICE.

THOMAS COOK, OF NEW YORK, N. Y., ASSIGNOR OF ONE-HALF HIS RIGHT TO JAMES E. NUTTMAN, AND SAID COOK AND NUTTMAN ASSIGNORS TO THE UNION ICE COMPANY.

IMPROVEMENT IN ICE-MACHINES.

Specification forming part of Letters Patent No. 171,267, dated December 21, 1875; application filed July 2, 1875.

*To all whom it may concern:*

Be it known that I, THOMAS COOK, of New York city, in the State of New York, have invented certain new and useful Improvements in Ice-Machines; and I do hereby declare the following to be a full, clear, and exact description of the same, reference being had to the accompanying drawings forming part of this specification, in which—

Figure 1 is a side elevation, partly in section; and Fig. 2 is a transverse vertical section of the same.

Similar letters of reference in the accompanying drawings denote the same parts.

This invention relates to that class of ice-machines in which the refrigerant is applied behind, and the water to be frozen in front of, the freezing-surface; and consists, first, in the combination of a rotary freezing-surface with a vertically-adjustable water-tank; secondly, in the combination of a rotary freezing-surface with an adjustable horizontal cutter for cutting the ice on the sides of the rotary surface; thirdly, in the combination of a rotary freezing-surface with an adjustable vertical cutter for cutting the ice on the edges of the rotary surface; fourthly, in the construction of the rotary freezing-wheel; fifthly, in the combination of a rotary freezing-surface with a sprayer or sprayers for applying water to be frozen in a solid mass built up of layers formed during the successive revolutions of the wheel; sixthly, in the combination of a rotary freezing-surface with a sprayer or sprayers for applying water to be frozen, and a tank to contain water for washing the surface of the frozen ice, for the purpose of removing any dirt therefrom; and, lastly, in the specific devices by which the various functions of the machine are performed, substantially as I will now proceed to set forth.

In the drawings, G is the ground floor of the manufactory. P is a pit beneath said floor. E E are hydraulic elevators, having pistons $e\ e$, capable of being raised or lowered by pumping water into or letting it escape from the cylinders $e'\ e'$. A is a water-tank supported upon the pistons $e\ e$, and adapted to be raised and lowered thereby. B B are two stout posts or standards above the ground floor. S is a hollow shaft, supported in suitable boxes on the posts B, the cavity within the shaft being divided in two, $s\ s'$, so that one end has no direct communication with the other. W is a wheel attached to, and revolving with, the shaft, and preferably having a broad rim, $w$, to form a proper foundation for the support of the ice. C is a convoluted pipe, connected at one end to the cavity $s$ of the shaft, and at the other end to the cavity $s'$, so as to form a tubular connection or channel between them. D is a slide-rest arranged on the standard B, and capable of being adjusted up and down by the screw $d$. $m$ is the vertical cutter attached adjustably to an arm of the slide-rest. $n$ is the horizontal cutter, also attached to the slide-rest, and capable of being adjusted longitudinally by means of a screw, $d'$. F is a pipe coiled in any suitable manner in the tank A. $f$ is a jointed pipe connecting the pipe F with the exhaust end of the shaft S. $f'$ is a similarly-jointed pipe connecting the other end of pipe F with the condensing apparatus, (not shown in the drawings;) and H is a spray-pipe supported in any suitable manner over the wheel W C, so as to be capable of spraying water thereon. This pipe is preferably supplied from the tank A, and to that end it may be connected thereto by jointed connections like that shown at $f$, and may be provided with any form of pump for forcing the water up from the tank.

The whole apparatus may be driven by any suitable motive power. Its operation is as follows: The tank A is filled, or partially filled, with water, and is raised to the proper height, so that the lower edge of the wheel will dip into the water. The refrigerant is then forced into the shaft by any suitable pipe-connection at $s$; and passing from $s$ it enters the pipe C, proceeds out through the alternate convolutions $c^1\ c^1\ c^1$ to the bend $c^2$, turns and proceeds back through the alternate convolutions $c^3\ c^3\ c^3$ to the exhaust end $s'$ of the shaft, and thence goes through pipes $f$ F $f'$ to the condensing apparatus. Meanwhile the wheel A C is set in motion, and, revolving with its lower edge in the water, it takes up a large quantity of water, a portion of which freezes to the pipes C, while the remainder washes down over the ice thus formed, cleansing and purifying the latter from dirt, air-bubbles, &c., so that the ice formed on the revolving pipes is perfectly clear and hard. If preferred, the sprayer may be started up in connection with the ice-wheel, so as to spray water upon the wheel to be frozen, the revolution of the wheel immediately carrying such ice through the water in the tank, and thus washing it clear and hard, as above described. The ice will freeze uniformly on all parts of the wheel by reason of the peculiar arrangement of the return convolutions $c^3\ c^3$, between the convolutions $c^1\ c^1$, the relatively warmer parts of the pipe being distributed uniformly between the colder parts; or, in other words, the excess of one pipe at any point below the mean temperature of the whole being offset by the excess of the adjacent pipe at the same point above the mean temperature of the whole, the point of mean temperature being at $c^2$, and the extremes of temperature being at the ends of pipe C.

The ice at first forms around the pipes $c^1\ c^3$ until it connects them firmly together, when the freezing proceeds on the sides and outer edge of the ice-wheel until a solid mass several feet thick is formed upon the wheel. The horizontal knife is then advanced against the side of the wheel, and, as the wheel revolves, cuts a deep annular incision into the ice. This cutter is then withdrawn, and the vertical knife is depressed against the edge of the ice, dividing an annular block from the mass, but which block will be held in place by the breadth of its own base until the wheel is stopped and it is cut up into suitable short blocks for delivery, beginning preferably at its lower edge, and dividing them from the annular block by axes or saws. The ice having been thus removed from the sides of the wheel, the supporting ice between and immediately around the pipes is not interfered with, and the freezing is ready to proceed without loss of time. The great inconvenience and expense of heating the pipes in order to detach the ice, as heretofore practiced, is thus entirely avoided, and there is no alternate expanding and contracting of the pipes to open the joints, rack the ice-wheel, and render the whole apparatus useless. There are in fact no joints to be opened, for the pipe C may be made continuous from end to end, and its arrangement will enable it to contract or expand without danger in case it should be desired to pass hot air, water, or steam through it at any time. The cutters are to be arranged on each side of the ice-wheel. Instead of screws to adjust them and feed them forward against the ice, they may be fed forward by means of weights or springs, so arranged as to press against first one cutter-slide and then the other, to cause the knives to bear with a yielding continuous pressure against the ice until the incisions have been made therein to the required depth. The spray-pipes may be supplied from any other source than the tank A, if preferred, the only advantage of using water from said tank being that this water is nearly at the freezing-point, and therefore freezes more rapidly when applied to the wheel. The exhaust gas or other refrigerant may, however, if preferred, be led through a different tank, not movable, in order to avoid the multiplication of joints, and the water of such tank may be used for the spray pipe or pipes.

Instead of raising and lowering the tank by means of hydraulic elevators, any other hoisting apparatus may be employed that will answer the purpose.

I claim as my invention—

1. The combination of a rotary freezing-wheel with a vertically-adjustable tank, in which the lower edge of the wheel rotates, substantially as described.

2. The combination of a rotary freezing-surface with an adjustable horizontal cutter, substantially as and for the purpose described.

3. The combination of a rotary freezing-surface with an adjustable vertical cutter, substantially as and for the purpose described.

4. The combination of a rotary freezing-surface with an adjustable horizontal and an adjustable vertical cutter, substantially as and for the purpose described.

5. The combination of a rotary freezing-surface with spray-pipes arranged to spray water upon such surface, substantially as described.

6. The combination of a rotary freezing-surface with spray-pipes arranged to spray water upon such surface, and with a tank into which the lower edge of the wheel dips, for the purpose of washing such surface, substantially as described.

7. The wheel A C, composed of a hollow shaft, a suitable central support or hub, and a pipe or pipes arranged in convolutions around the hub, substantially as described.

8. In a freezing-wheel, the pipe C, having the convolutions through which the refrigerant returns from the periphery of the wheel arranged between the convolutions through which said refrigerant moves outward from the hub, substantially as described.

THOS. COOK.

Witnesses:
E. S. KARNER,
F. McKENNY.